US010652601B2

(12) United States Patent
Opsalik et al.

(10) Patent No.: US 10,652,601 B2
(45) Date of Patent: *May 12, 2020

(54) SYSTEM AND METHOD FOR MONITORING WHOLE HOME DIGITAL VIDEO RECORDER USAGE FOR INTERNET PROTOCOL TELEVISION

(71) Applicant: AT&T Intellectual Property I, L.P., Atlanta, GA (US)

(72) Inventors: Kenneth Opsalik, Plainfield, IL (US); Marisa Earnshaw, Naugatuck, CT (US); Daniel P. Malee, Wheaton, IL (US); John Mathew, Mount Prospect, IL (US); Giya Tektumandize, Riverwood, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 62 days.

This patent is subject to a terminal disclaimer.

(21) Appl. No.: 15/723,772

(22) Filed: Oct. 3, 2017

(65) Prior Publication Data
US 2018/0041790 A1  Feb. 8, 2018

Related U.S. Application Data

(63) Continuation of application No. 15/172,961, filed on Jun. 3, 2016, now Pat. No. 9,813,747, which is a (Continued)

(51) Int. Cl.
*H04N 21/2662* (2011.01)
*H04N 7/173* (2011.01)
(Continued)

(52) U.S. Cl.
CPC ..... *H04N 21/2662* (2013.01); *H04N 7/17336* (2013.01); *H04N 21/2393* (2013.01);
(Continued)

(58) Field of Classification Search
CPC .......... H04N 21/2662; H04N 21/6582; H04N 21/6125; H04N 7/17336; H04N 21/26216;
(Continued)

(56) References Cited

U.S. PATENT DOCUMENTS 5,583,995 A   12/1996 Alan
5,812,930 A   9/1998 Robert
(Continued)

*Primary Examiner* — Benjamin R Bruckart
*Assistant Examiner* — Aklil M Tesfaye
(74) *Attorney, Agent, or Firm* — Guntin & Gust, PLC; John G. Rauch

(57) ABSTRACT

The subject disclosure describes identifying a table associated with a set-top box that receives services from equipment of a video head-end office, where the table indicates that the set-top box has requested a video stream that would exceed a first number of video streams allocated to the set-top box and would exceed a bandwidth configuration, detecting a conflicting event according to information in the table, reconfiguring the bandwidth configuration allocated to the plurality of set-top boxes to resolve the conflicting event, determining a second number of video streams requested by the plurality of set-top boxes when the conflicting event occurred, determining a third number of video streams to resolve the conflicting event based on a difference between the first number of video streams and the second number of video streams, and instructing the equipment to provide the third number of video streams to the set-top box. Other embodiments are disclosed.

20 Claims, 7 Drawing Sheets

Related U.S. Application Data continuation of application No. 13/847,055, filed on Mar. 19, 2013, now Pat. No. 9,386,333, which is a continuation of application No. 12/580,862, filed on Oct. 16, 2009, now Pat. No. 8,434,121.

(51) Int. Cl.

| | | |
|---|---|---|
| *H04N 21/239* | (2011.01) | |
| *H04N 21/24* | (2011.01) | |
| *H04N 21/262* | (2011.01) | |
| *H04N 21/472* | (2011.01) | |
| *H04N 21/61* | (2011.01) | |
| *H04N 21/658* | (2011.01) | |

(52) U.S. Cl.
CPC ... *H04N 21/2402* (2013.01); *H04N 21/26216* (2013.01); *H04N 21/47202* (2013.01); *H04N 21/6125* (2013.01); *H04N 21/6582* (2013.01)

(58) Field of Classification Search
CPC .......... H04N 21/2402; H04N 21/2393; H04N 21/47202
See application file for complete search history.

(56) References Cited

U.S. PATENT DOCUMENTS

| | | | |
|---|---|---|---|
| 6,282,713 | B1 | 8/2001 | Kitsukawa |
| 6,772,217 | B1 | 8/2004 | Gerald et al. |
| 6,909,726 | B1 | 6/2005 | Sheeran |
| 6,917,628 | B2 | 7/2005 | McKinnin et al. |
| 7,113,736 | B2 | 9/2006 | Kikuchi et al. |
| 7,149,710 | B1 | 12/2006 | Edmark |
| 7,207,055 | B1 | 4/2007 | Hendricks et al. |
| 7,293,280 | B1 | 11/2007 | Gupta |
| 7,305,696 | B2 | 12/2007 | Gomer et al. |
| 7,412,516 | B1 | 8/2008 | Brown et al. |
| 7,444,659 | B2 | 10/2008 | Lemmons |
| 7,549,160 | B1 | 6/2009 | Podar et al. |
| 7,584,497 | B2 | 9/2009 | Potrebic et al. |
| 7,603,022 | B2 | 10/2009 | Putterman et al. |
| 8,149,771 | B2 | 4/2012 | Khivesara et al. |
| 8,224,936 | B2 | 7/2012 | Alan et al. |
| 2002/0031120 | A1 | 3/2002 | Rakib |
| 2002/0040475 | A1 | 4/2002 | Yap et al. |
| 2002/0083469 | A1 | 6/2002 | Jeannin |
| 2002/0095684 | A1 | 7/2002 | St. John et al. |
| 2002/0112237 | A1 | 8/2002 | Kelts |
| 2002/0167967 | A1 | 11/2002 | Jammes et al. |
| 2003/0025832 | A1 | 2/2003 | Swart et al. |
| 2003/0225845 | A1 | 12/2003 | Hong |
| 2005/0229227 | A1 | 10/2005 | Rogers |
| 2005/0289618 | A1* | 12/2005 | Hardin .................... H04L 47/15 725/95 |
| 2006/0064730 | A1 | 3/2006 | Rael et al. |
| 2006/0230123 | A1 | 10/2006 | Simmons |
| 2006/0268099 | A1* | 11/2006 | Potrebic ................. H04N 5/782 348/14.01 |
| 2006/0287915 | A1 | 12/2006 | Boulet et al. |
| 2006/0288374 | A1 | 12/2006 | Ferris et al. |
| 2007/0160142 | A1 | 7/2007 | Abrams |
| 2007/0174287 | A1 | 7/2007 | McEnroe et al. |
| 2007/0174883 | A1 | 7/2007 | McEnroe et al. |
| 2007/0201446 | A1 | 8/2007 | Wright |
| 2007/0250880 | A1 | 10/2007 | Hainline |
| 2007/0261088 | A1 | 11/2007 | Phillips et al. |
| 2007/0283397 | A1 | 12/2007 | Scholl |
| 2007/0291775 | A1 | 12/2007 | Frantz et al. |
| 2007/0294717 | A1* | 12/2007 | Hill .................... H04N 7/17318 725/25 |
| 2008/0046912 | A1* | 2/2008 | Gemelos ................ H04H 20/12 725/14 |
| 2008/0059884 | A1 | 3/2008 | Ellis et al. |
| 2008/0077964 | A1* | 3/2008 | Hamilton ........... G06Q 30/0641 725/87 |
| 2008/0080368 | A1 | 4/2008 | Fan et al. |
| 2008/0137587 | A1 | 6/2008 | Matsukura et al. |
| 2008/0148322 | A1 | 6/2008 | Howcroft |
| 2008/0148324 | A1 | 6/2008 | Gerald et al. |
| 2008/0255961 | A1 | 10/2008 | Livesay |
| 2008/0282308 | A1 | 11/2008 | McDonald et al. |
| 2008/0285936 | A1 | 11/2008 | Yampanis et al. |
| 2009/0040929 | A1 | 2/2009 | Lee et al. |
| 2009/0064219 | A1 | 3/2009 | Minor |
| 2009/0064252 | A1* | 3/2009 | Howarter ........... H04N 21/2385 725/114 |
| 2009/0100459 | A1 | 4/2009 | Riedl et al. |
| 2010/0005499 | A1 | 1/2010 | Covey |
| 2010/0192170 | A1 | 7/2010 | Raleigh |
| 2010/0202754 | A1 | 8/2010 | Bhogal et al. |
| 2010/0211982 | A1 | 8/2010 | Lee et al. |
| 2010/0235432 | A1 | 9/2010 | Trojer |
| 2016/0286255 | A1 | 9/2016 | Ospalik et al. |

* cited by examiner

SYSTEM AND METHOD FOR MONITORING WHOLE HOME DIGITAL VIDEO RECORDER USAGE FOR INTERNET PROTOCOL TELEVISION

CROSS-REFERENCE TO RELATED APPLICATIONS

This application is a continuation of U.S. patent application Ser. No. 15/172,961 filed Jun. 3, 2016, which is a continuation of U.S. patent application Ser. No. 13/847,055 filed Mar. 19, 2013 (now U.S. Pat. No. 9,386,333), which is a continuation of U.S. patent application Ser. No. 12/580,862 filed Oct. 16, 2009 (now U.S. Pat. No. 8,434,121), each of which are incorporated by reference herein in their entirety.

FIELD OF THE DISCLOSURE

The present disclosure generally relates to communications networks, and more particularly relates to systems and method for monitoring whole home digital video recorder usage for Internet Protocol television.

BACKGROUND OF THE DISCLOSURE

An Internet Protocol television (IPTV) service provider can transmit an IPTV signal to a user via a central office, a serving area interface, and a residential gateway. The IPTV service provider can offer the user a variety of different television programs and/or movies. For example, the IPTV service provider can supply users with real-time television programs that are typically available for the users to watch only at a specific date and time. The IPTV service provider can also offer the users on-demand movies that are available for an extended amount of time and that are provided to the users upon request of the on-demand movie.

BRIEF DESCRIPTION OF THE DRAWINGS

It will be appreciated that for simplicity and clarity of illustration, elements illustrated in the FIGS have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
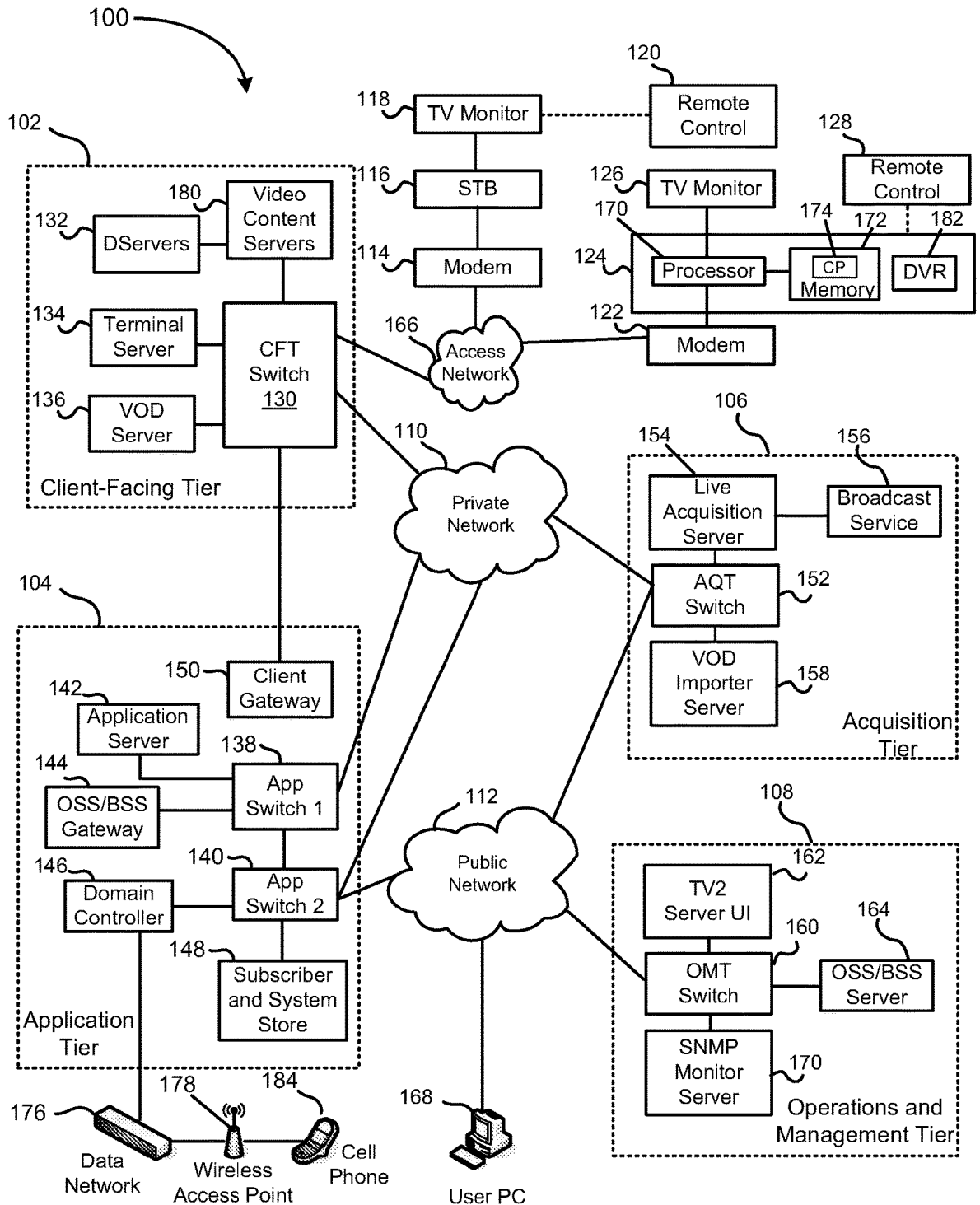
FIG. 1 is a block diagram illustrating an Internet Protocol Television (IPTV) network in accordance with one embodiment of the present disclosure.

FIG. 1 shows an IPTV system 100 including a client facing tier 102, an application tier 104, an acquisition tier 106, and an operations and management tier 108. Each tier 102, 104, 106, and 108 is coupled to one or both of a private network 110 and a public network 112. For example, the client-facing tier 102 can be coupled to the private network 110, while the application tier 104 can be coupled to the private network 110 and to the public network 112 such as the Internet. The acquisition tier 106 can also be coupled to the private network 110 and to the public network 112. Moreover, the operations and management tier 108 can be coupled to the public network 112.

The various tiers 102, 104, 106, and 108 communicate with each other via the private network 110 and the public network 112. For instance, the client-facing tier 102 can communicate with the application tier 104 and the acquisition tier 106 via the private network 110. The application tier 104 can also communicate with the acquisition tier 106 via the private network 110. Further, the application tier 104 can communicate with the acquisition tier 106 and the operations and management tier 108 via the public network 112. Moreover, the acquisition tier 106 can communicate with the operations and management tier 108 via the public network 112. In a particular embodiment, elements of the application tier 104 can communicate directly with the client-facing tier 102.

The client-facing tier 102 can communicate with user equipment via a private access network 166, such as an Internet Protocol Television (IPTV) network. In an illustrative embodiment, modems such as a first modem 114 and a second modem 122 can be coupled to the private access network 166. The client-facing tier 102 can communicate with a first representative set-top box (STB) device 116 via the first modem 114 and with a second representative set-top box device 124 via the second modem 122. The client-facing tier 102 can communicate with a large number of set-top boxes over a wide geographic area, such as a regional area, a metropolitan area, a viewing area, or any other suitable geographic area that can be supported by networking the client-facing tier 102 to numerous set-top box devices. In one embodiment, the client-facing tier 102 can be coupled to the modems 114 and 122 via fiber optic cables. Alternatively, the modems 114 and 122 can be digital subscriber line (DSL) modems that are coupled to one or more network nodes via twisted pairs, and the client-facing tier 102 can be coupled to the network nodes via fiber-optic cables. Each set-top box device 116 and 124 can process data received from the private access network 166 via an IPTV software platform such as Microsoft™ TV IPTV Edition.

The first set-top box device 116 can be coupled to a first display device 118, such as a first television monitor, and the second set-top box device 124 can be coupled to a second display device 126, such as a second television monitor. Moreover, the first set-top box device 116 can communicate with a first remote control 120, and the second set-top box device can communicate with a second remote control 128. In an exemplary, non-limiting embodiment, each set-top box device 116 and 124 can receive data or video from the client-facing tier 102 via the private access network 166 and render or display the data or video at the display device 118 or 126 to which it is coupled. The set-top box devices 116 and 124 thus may include tuners that receive and decode television programming information for transmission to the display devices 118 and 126. Further, the set-top box devices 116 and 124 can include an STB processor 170 and an STB memory device 172 that is accessible to the STB processor. In a particular embodiment, the set-top box devices 116 and 124 can also communicate commands received from the remote controls 120 and 128 back to the client-facing tier 102 via the private access network 166.

In an illustrative embodiment, the client-facing tier 102 can include a client-facing tier (CFT) switch 130 that manages communication between the client-facing tier 102 and the private access network 166 and between the client-facing tier 102 and the private network 110. As shown, the CFT switch 130 is coupled to one or more data servers 132 that store data transmitted in response to user requests, such as video-on-demand material. The CFT switch 130 can also be coupled to a terminal server 134 that provides terminal devices, such as a game application server and other devices with a common connection point to the private network 110. In a particular embodiment, the CFT switch 130 can also be coupled to a video-on-demand (VOD) server 136.

The application tier 104 can communicate with both the private network 110 and the public network 112. In this embodiment, the application tier 104 can include a first application tier (APP) switch 138 and a second APP switch 140. In a particular embodiment, the first APP switch 138 can be coupled to the second APP switch 140. The first APP switch 138 can be coupled to an application server 142 and to an OSS/BSS gateway 144. The application server 142 provides applications to the set-top box devices 116 and 124 via the private access network 166, so the set-top box devices 116 and 124 can provide functions such as display, messaging, processing of IPTV data and VOD material. In a particular embodiment, the OSS/BSS gateway 144 includes operation systems and support (OSS) data, as well as billing systems and support (BSS) data.

The second APP switch 140 can be coupled to a domain controller 146 that provides web access, for example, to users via the public network 112. The second APP switch 140 can be coupled to a subscriber and system store 148 that includes account information, such as account information that is associated with users who access the system 100 via the private network 110 or the public network 112. In a particular embodiment, the application tier 104 can also include a client gateway 150 that communicates data directly to the client-facing tier 102. In this embodiment, the client gateway 150 can be coupled directly to the CFT switch 130. The client gateway 150 can provide user access to the private network 110 and the tiers coupled thereto.

In a particular embodiment, the set-top box devices 116 and 124 can access the system via the private access network 166 using information received from the client gateway 150. The private access network 166 provides security for the private network 110. User devices can access the client gateway 150 via the private access network 166, and the client gateway 150 can allow such devices to access the private network 110 once the devices are authenticated or verified. Similarly, the client gateway 150 can prevent unauthorized devices, such as hacker computers or stolen set-top box devices, from accessing the private network 110 by denying access to these devices beyond the private access network 166.

For example, when the set-top box device 116 accesses the system 100 via the private access network 166, the client gateway 150 can verify subscriber information by communicating with the subscriber and system store 148 via the private network 110, the first APP switch 138 and the second APP switch 140. Further, the client gateway 150 can verify billing information and status by communicating with the OSS/BSS gateway 144 via the private network 110 and the first APP switch 138. The OSS/BSS gateway 144 can transmit a query across the first APP switch 138, to the second APP switch 140, and the second APP switch 140 can communicate the query across the public network 112 to the OSS/BSS server 164. After the client gateway 150 confirms subscriber and/or billing information, the client gateway 150 can allow the set-top box device 116 access to IPTV content and VOD content. If the client gateway 150 cannot verify subscriber information for the set-top box device 116, such as because it is connected to a different twisted pair, the client gateway 150 can deny transmissions to and from the set-top box device 116 beyond the private access network 166.

The acquisition tier 106 includes an acquisition tier (AQT) switch 152 that communicates with the private network 110. The AQT switch 152 can also communicate with the operations and management tier 108 via the public network 112. In a particular embodiment, the AQT switch 152 can be coupled to a live acquisition server 154 that receives television content, for example, from a broadcast service 156. Further, the AQT switch can be coupled to a video-on-demand importer server 158 that stores television content received at the acquisition tier 106 and communicate the stored content to the client-facing tier 102 via the private network 110.

The operations and management tier 108 can include an operations and management tier (OMT) switch 160 that conducts communication between the operations and management tier 108 and the public network 112. In the illustrated embodiment, the OMT switch 160 is coupled to a TV2 server 162. Additionally, the OMT switch 160 can be coupled to an OSS/BSS server 164 and to a simple network management protocol (SNMP) monitor 166 that monitors network devices. In a particular embodiment, the OMT switch 160 can communicate with the AQT switch 152 via the public network 112.

In a particular embodiment during operation of the IPTV system, the live acquisition server 154 can acquire television content from the broadcast service 156. The live acquisition server 154 in turn can transmit the television content to the AQT switch 152 and the AQT switch can transmit the television content to the CFT switch 130 via the private network 110. Further, the television content can be encoded at the D-servers 132, and the CFT switch 130 can communicate the television content to the modems 114 and 122 via the private access network 166. The set-top box devices 116 and 124 can receive the television content from the modems 114 and 122, decode the television content, and transmit the content to the display devices 118 and 126 according to commands from the remote control devices 120 and 128.

Additionally, at the acquisition tier 106, the VOD importer server 158 can receive content from one or more VOD sources outside the IPTV system 100, such as movie studios and programmers of non-live content. The VOD importer server 158 can transmit the VOD content to the AQT switch 152, and the AQT switch 152 in turn can communicate the material to the CFT switch 130 via the private network 110. The VOD content can be stored at one or more servers, such as the VOD server 136.

When a user issues a request for VOD content to the set-top box device 116 or 124, the request can be transmitted over the private access network 166 to the VOD server 136 via the CFT switch 130. Upon receiving such a request, the VOD server 136 can retrieve requested VOD content and transmit the content to the set-top box device 116 or 124 across the private access network 166 via the CFT switch 130. In an illustrative embodiment, the live acquisition server 154 can transmit the television content to the AQT switch 152, and the AQT switch 152 in turn can transmit the television content to the OMT switch 160 via the public network 112. In this embodiment, the OMT switch 160 can transmit the television content to the TV2 server 162 for display to users accessing the user interface at the TV2 server. For example, a user can access the TV2 server 162 using a personal computer 168 coupled to the public network 112.

The domain controller 146 communicates with the public network 112 via the second APP switch 140. Additionally, the domain controller 146 can communicate via the public network 112 with the personal computer 168. For example, the domain controller 146 can display a web portal via the public network 112 and allow users to access the web portal using the PC 168. Further, in an illustrative embodiment, the domain controller 146 can communicate with at least one wireless network access point 178 over a data network 176. In this embodiment, each wireless network access device 178 can communicate with user wireless devices such as a cellular telephone 184.

In a particular embodiment, the set-top box devices can include an STB computer program 174 that is embedded within the STB memory device 172. The STB computer program 174 can contain instructions to receive and execute at least one user television viewing preference that a user has entered by accessing an Internet user account via the domain controller 146. For example, the user can use the PC 168 to access a web portal maintained by the domain controller 146 via the Internet. The domain controller 146 can query the subscriber and system store 148 via the private network 110 for account information associated with the user. In a particular embodiment, the account information can associate the user's Internet account with the second set-top box device 124. For instance, in an illustrative embodiment, the account information can relate the user's account to the second set-top box device 124 by associating the user account with an IP address of the second set-top box device, with data relating to one or more twisted pairs connected with the second set-top box device, with data related to one or more fiber optic cables connected with the second set-top box device, with an alphanumeric identifier of the second set-top box device, with any other data that is suitable for associating second set-top box device with a user account, or with any combination of these.

Figure 2:
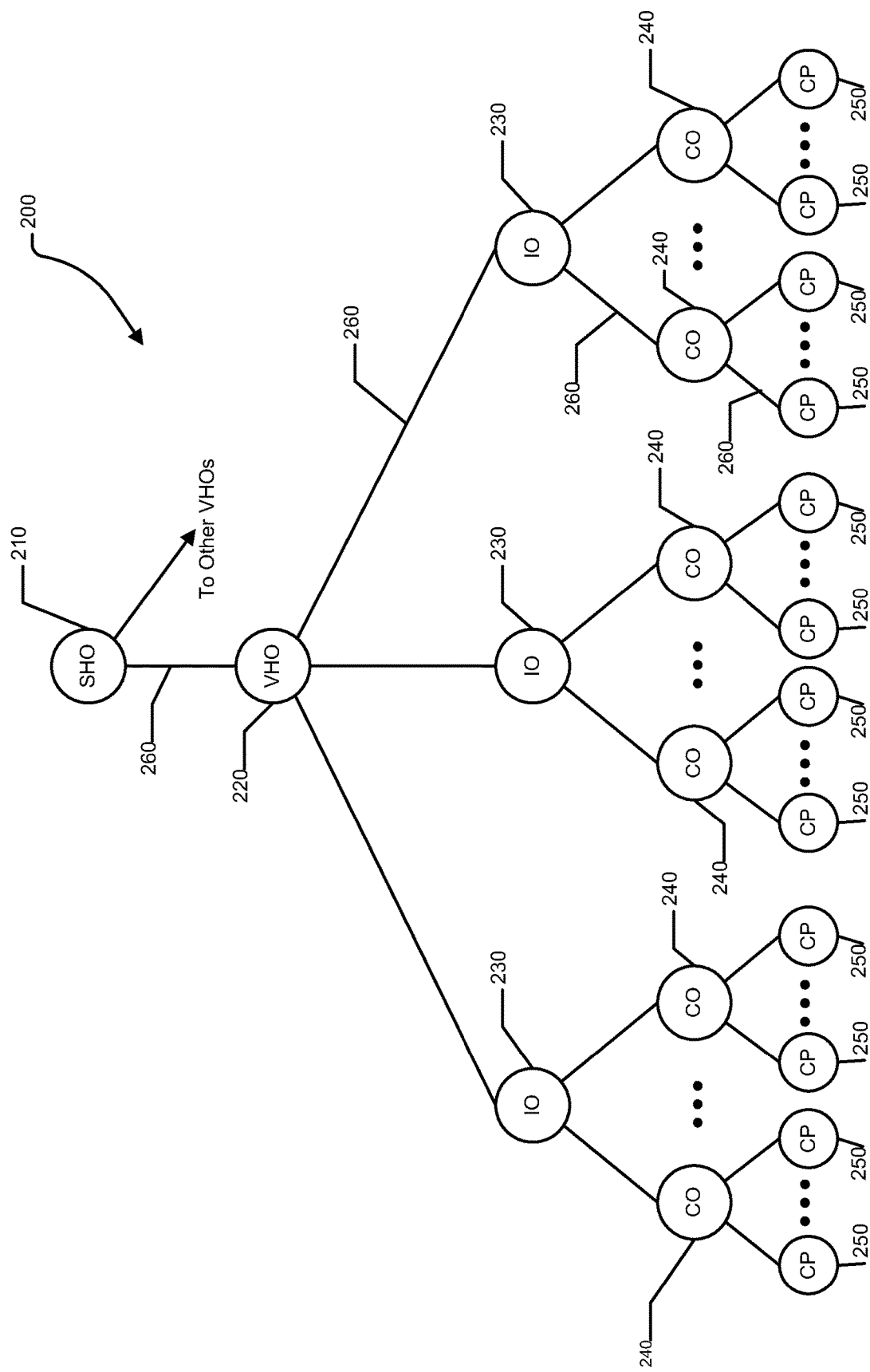
FIG. 2 is a block diagram illustrating an embodiment of the IPTV network.

FIG. 2 shows one example embodiment of a television distribution system or network 200, using IPTV technology in this example but not limited thereto, adapted to provide, among other things, the VOD content. The network 200 may include a super head-end office (SHO) 210 for acquisition and encoding of video content, one or more video head-end offices (VHO) 220 in each demographic market area (DMA), one or more intermediate offices (IO) 230, one or more central offices (CO) 240 located in each metropolitan area, and customer premises 250, that may be located in single or multiple dwelling units. In one example embodiment, the network 200 may be connected through a plurality of high speed communication links 260 using physical transport layers such as fiber, cable, twisted pair, air, or other media.

In one example embodiment of the IPTV video delivery system, the SHO 210 distributes VOD content to one or more VHOs 220, which may be spread across a wide geographic territory such as an entire country. The SHO 210 may, for example, be in a central location for acquisition and aggregation of national-level broadcast television (or linear) programming, and VOD assets. A redundant SHO 210 may be provided for backup in case of failure. The SHO 210 may also provide the central point of VOD content acquisition and insertion into the IPTV network. VOD content may be received from various sources and processed/encoded to codec and bit-rate requirements for the communication network for transmission to the VHO 220 over the high speed communication links. The VHOs 220 are the video distribution points within each DMA or geographic region.

Figure 3:
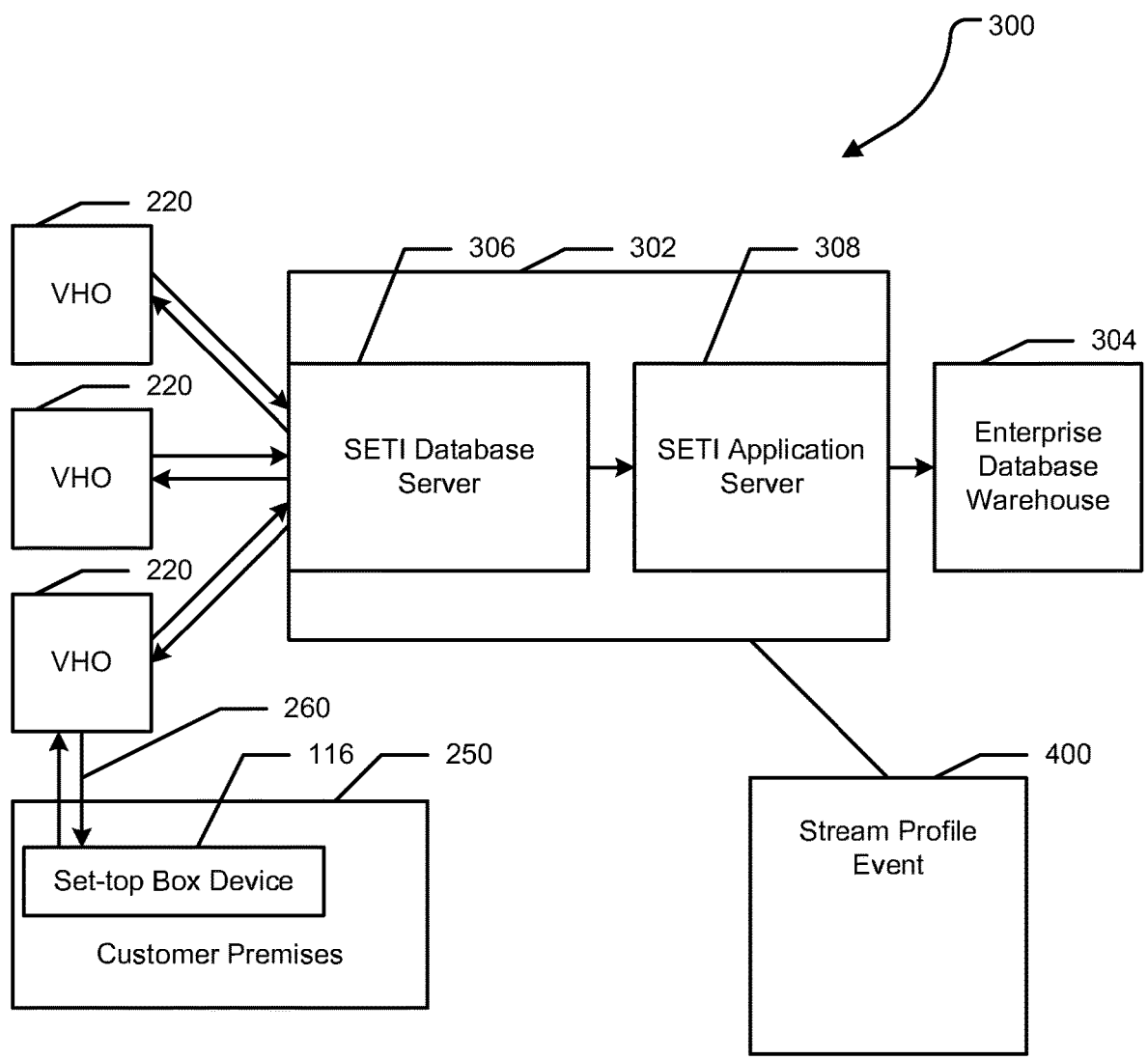
FIG. 3 is a block diagram of a portion of the IPTV network.

FIG. 3 shows a portion 300 of the IPTV network including the VHOs 220, a subscriber event transmission interface (SETI) 302, and an enterprise database warehouse (EDW) 304. The VHO 220 is in communication with the set-top box device 116 located at the customer premises 250, and in communication with the SETI 302, which in turn is in communication with the EDW 304. The SETI 302 preferably includes a SETI database server 306 and a SETI application server 308. The SETI database server 306 is in communication with the VHOs 220 and with the SETI application server 308, which in turn is in communication with the EDW 304.

When a new customer premises 250 is connected to the VHO 220, the customer premises can be allocated a specific amount of bandwidth for transmission of IPTV video streams over the communication link 260. Additionally, the amount of bandwidth allocated for the IPTV video streams can be divided up into an amount of bandwidth available for ingress into the customer premises 250 and an amount of bandwidth available for egress from the customer premises. During the connection of the IPTV service to the customer premises 250, a total number of high-definition (HD) video streams and a total number of standard-definition (SD) video streams available for ingress and egress from the customer premises can be set based on the amount of bandwidth available for ingress and the amount of bandwidth available for egress. For example, the number of HD and SD video streams available for ingress to the customer premises 250 can be four total video streams, such as one HD video stream and three SD video streams. In another embodiment, the number of HD and SD video streams available for ingress to the customer premises 250 can be allocated as two HD video streams and two SD video streams.

The total amount of bandwidth allocated to the customer premises 250, the total number of HD video streams, and the total number of SD video streams available for ingress and egress from the customer premises can be compiled as a bandwidth configuration for the customer premises. The VHO 220 associated with the customer premises 250 can generate a stream profile event for the customer premises, such that the stream profile event includes the bandwidth configuration of the customer premises. The VHO 220 can store a stream profile event for each respective customer premises 250 connected to the VHO. The stream profile event can be stored in the VHO 220 when a customer premises 250 is first connected to the IPTV service, and a new stream profile event can be stored for the customer premises when the amount of bandwidth allocated to the customer premises and/or the number of HD and SD video streams available to the customer premises have changed.

When the connection of the IPTV service to the customer premises 250 is completed, the customer premises can have multiple set-top box devices that each can receive and display different video streams from the IPTV network 100. The set-top box devices can also include digital video recorders, such that the set-top box devices can record the video streams received from the IPTV network 100. When a set-top box device associated with customer premises 250 requests a video stream of a television channel, the requested video stream may exceed the amount of bandwidth allocated to the customer premises and/or may exceed the number of HD and/or SD video streams available to the customer premises. When the amount of bandwidth and/or the number of video streams available are exceeded, the VHO 220 can generate a stream conflict event for the customer premises 250. The stream conflict event can include the total number of HD video streams then being used by the customer premises 250, the total number of SD video streams being used by the customer premises, and the total amount of bandwidth being used by the customer premises when the stream conflict event is generated. The stream conflict event can also include an identification of the set-top box device within the customer premises 250 that caused the amount of bandwidth and/or the number of video streams available to be exceeded, as discussed more fully below with respect to FIG. 4. The VHO 220 can store separate stream profile events and stream conflict events for each of the customer premises 250.

The SETI database server 302 can perform a SETI data collection process to collect the stream profile events and the stream conflict events from each of the VHOs 220. Thus, the SETI database server 302 can obtain the different stream profile events and stream conflict events for each of the customer premises 250 from the VHOs 220. The SETI database server 302 can generate a data file for each VHO 220 based on the stream profile events and on the stream conflict events received from the VHO. The SETI database server 302 can then transfer the data from the file of the VHO 220 to a staging table 400 shown in FIG. 4.

Figure 4:
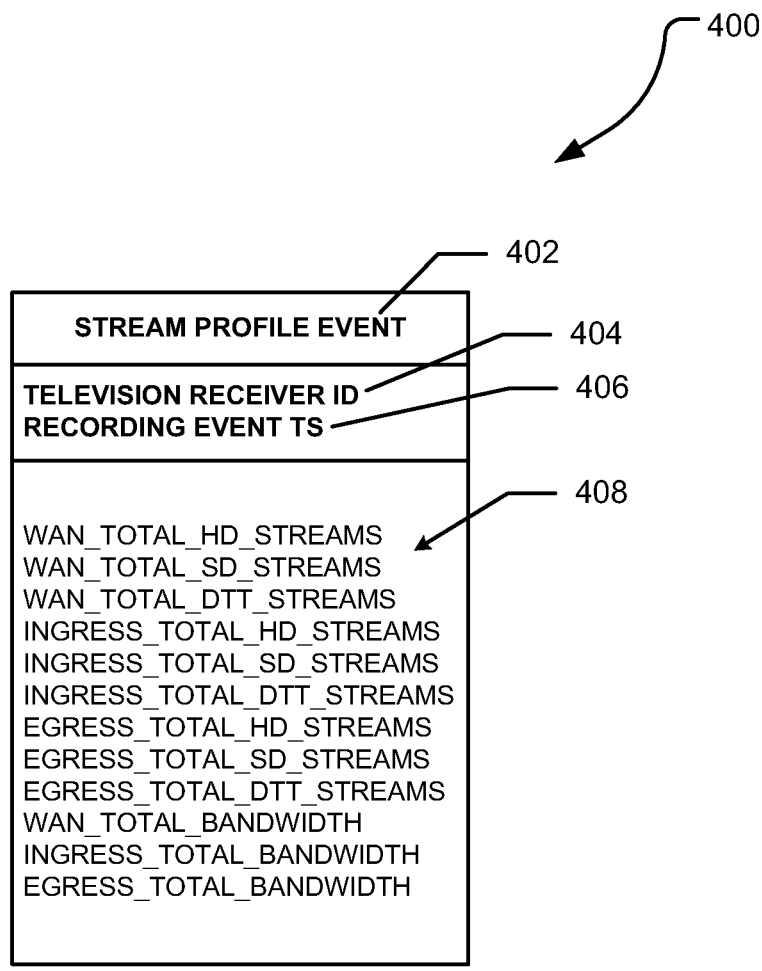
FIG. 4 is an exemplary staging table including bandwidth configuration data for a customer premises of the IPTV network.

FIG. 4 shows an exemplary embodiment of the staging table 400 for a stream profile event 402. In another embodiment, the staging table 400 can be for a stream conflict event. The staging table 400 includes a television receiver or set-top box device identification 404, a recording event time stamp 406, and data 408. The television receiver identification 404 can be used to identify the set-top box device, such as the set-top box device 116, within the customer premises 250 that is associated with the stream profile event. If the staging table 400 is a stream conflict event, the television receiver identification 404 can be used to identify the set-top box device that caused the stream conflict event to be generated. The recording event time stamp 406 can be used to identify when the stream profile event 402 or the stream conflict event was generated, such as the date, and time.

The data 408 recorded in the staging table 400 for the stream profile event 402 can include the total number of HD video streams and SD video streams available in a wide area network (WAN) between the VHO 220 and the customer premises 250. The data 408 can also include the total number of ingress and egress HD video streams and SD video streams available to the customer premises 250. Additionally, the data 408 can include the total amount of bandwidth allocated to the WAN, the total amount of ingress bandwidth allocated in the WAN, and the total amount of egress bandwidth allocated in the WAN. A stream conflict event staging table can include some of the same data as the stream profile event 402 and can additionally include the number of SD and HD video streams being recorded, the total amount of bandwidth being consumed, the total number of SD and HD video streams being used, and the like when the stream conflict event is generated.

Referring again to FIG. 3, the SETI application server 308 can convert the staging table 400 into a file that can be processed by the EDW 304. The SETI application server 308 can send the formatted file to the EDW 304, which in turn can use the data in the formatted file to determine the current bandwidth configuration for the customer premises 250 and to determine a reason for the stream conflict event. For example, based on the stream profile event, the EDW 304 can identify that a specific total amount of bandwidth is currently allocated to the customer premises 250, and that two HD video streams and two SD video streams are available to the customer premises. Based on the stream conflict event for the customer premises 250, the EDW 304 can identify that the number of HD video streams available to the customer premises was exceeded because the set-top box device 116 was recording two HD video streams and requested to receive a third HD video stream.

The EDW 304 can use the television receiver identification 404 and the recording event time stamp 406 to determine how often a specific set-top box device exceeds a limit set in the stream profile event. The EDW 304 can also use the data from the stream profile event and the stream conflict event to determine what the current settings are for the customer premises 250 and whether the current settings should be updated. For example, if the EDW 304 continually receives stream conflict events indicating that the number of HD and/or SD video streams available to the customer premises 250 is being exceeded, the EDW 304 can determine that the number of HD and/or SD video streams available should be increased. The EDW 304 can then use the stream profile event to identify the number of HD and/or SD video streams currently available to the customer premises 250, such that the EDW can determine a new total number of HD and/or SD video streams to make available to the customer premises.

Figure 5:
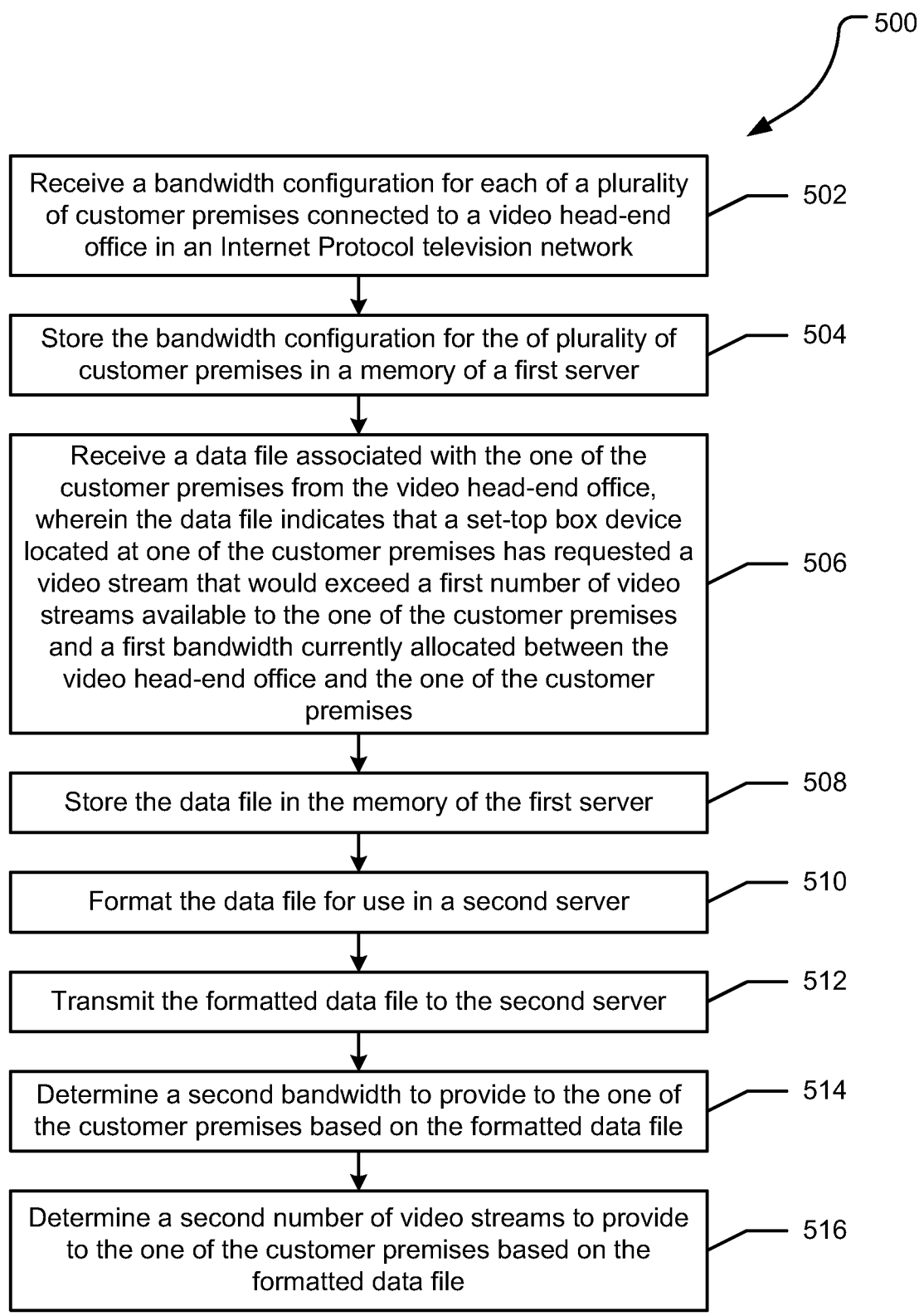
FIG. 5 is a flow diagram of a method for generating a stream conflict event for the IPTV network.

FIG. 5 shows a flow diagram of a method 500 for generating a stream conflict event for the IPTV network 100. At block 502, a bandwidth configuration for each of a plurality of customer premises connected to a VHO is received. The bandwidth configuration can include the total amount of bandwidth allocated to the customer premises, the total number of HD video streams available for ingress and egress from the customer premises, the total number of SD video streams available for ingress and egress from the customer premises, and the like. The bandwidth configuration for each of the plurality of customer premises is stored in a memory of a first server at block 504. At block 506, a data file associated with one of the customer premises is received from the VHO. The data file can indicate that a set-top box device located at the one of the customer premises has requested a video stream that would exceed a first number of video streams available to the one of the customer premises and wound exceed a first bandwidth currently allocated between the VHO and the one of the customer premises.

At block 508, the data file is stored in the memory of the first server. The data file is formatted for use in a second server at block 510. At block 512, the formatted data file is transmitted to the second server. A second bandwidth to provide to the one of the customer premises is determined based on the formatted data file at block 514. At block 516, a second number of video streams to provide to the one of the customer premises is determined based on the formatted data file.

Figure 6:
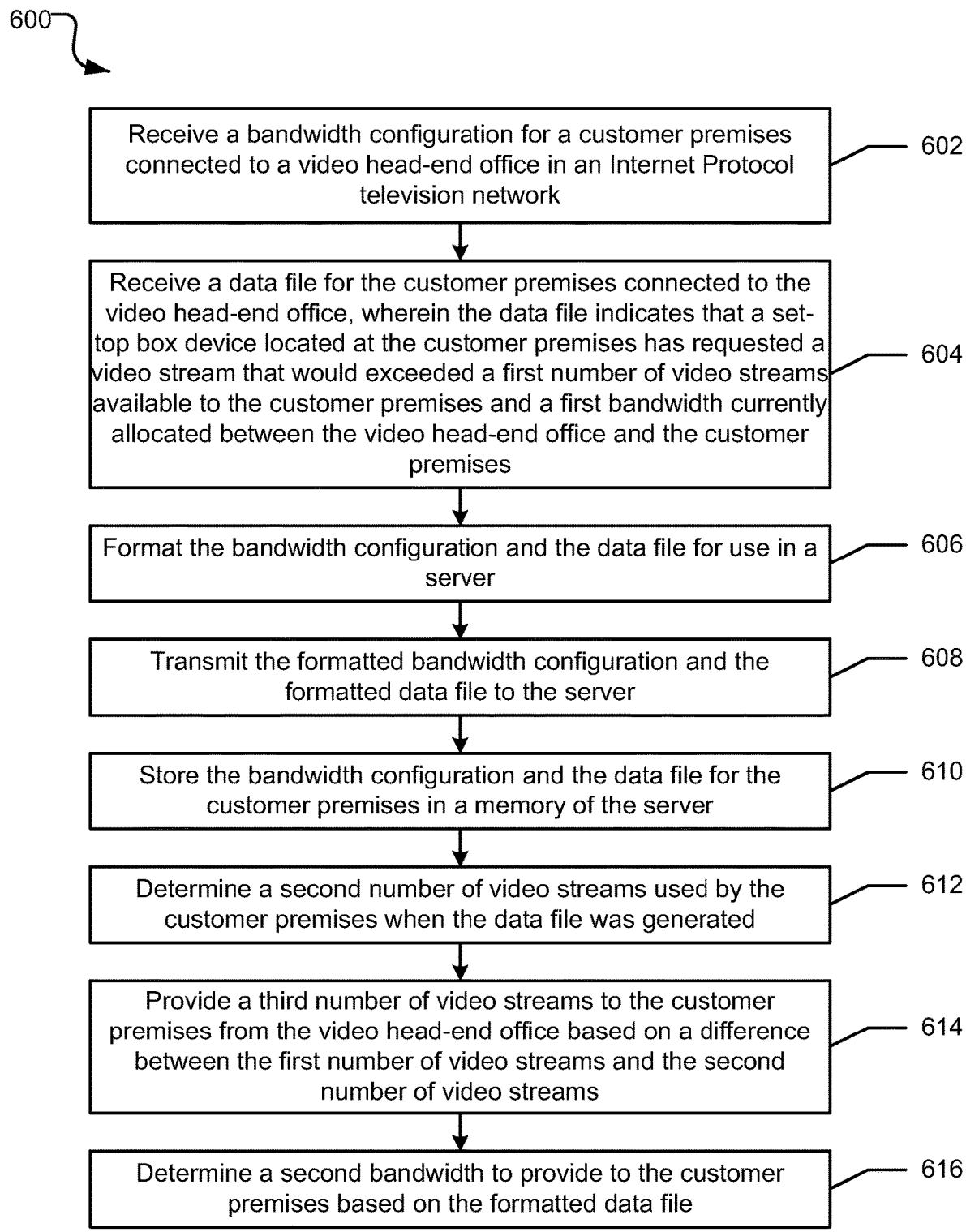
FIG. 6 is a flow diagram of a method for updating the bandwidth configuration of the customer premises of the IPTV network.

FIG. 6 shows a flow diagram of a method 600 for updating the bandwidth configuration of the customer premises of the IPTV network 100. At block 602, a bandwidth configuration is received for a customer premises connected to a VHO of the IPTV network. The bandwidth configuration can include the total amount of bandwidth allocated to the customer premises, the total number of HD video streams available for ingress and egress from the customer premises, the total number of SD video streams available for ingress and egress from the customer premises, and the like. A data file is received for the customer premises at block 604. The data file can indicate that a set-top box device located at the customer premises has requested a video stream that would exceed a first number of video streams available to the customer premises and wound exceed a first bandwidth currently allocated between the VHO and the customer premises. At block 606, the bandwidth configuration and the data file are formatted for use in a server. The formatted bandwidth configuration and the formatted data file are transmitted to the server at block 608.

At block 610, the bandwidth configuration and the data file for the customer premises are stored in a memory of the server. At block 612, a second number of video streams used by the customer premises when the data file was generated are determined. A third number of video streams are provided to the customer premises from the VHO based on a difference between the first number of video streams and the second number of video streams at block 614. At block 616, a second bandwidth to provide to the customer premises is determined based on the formatted data file.

Figure 7:
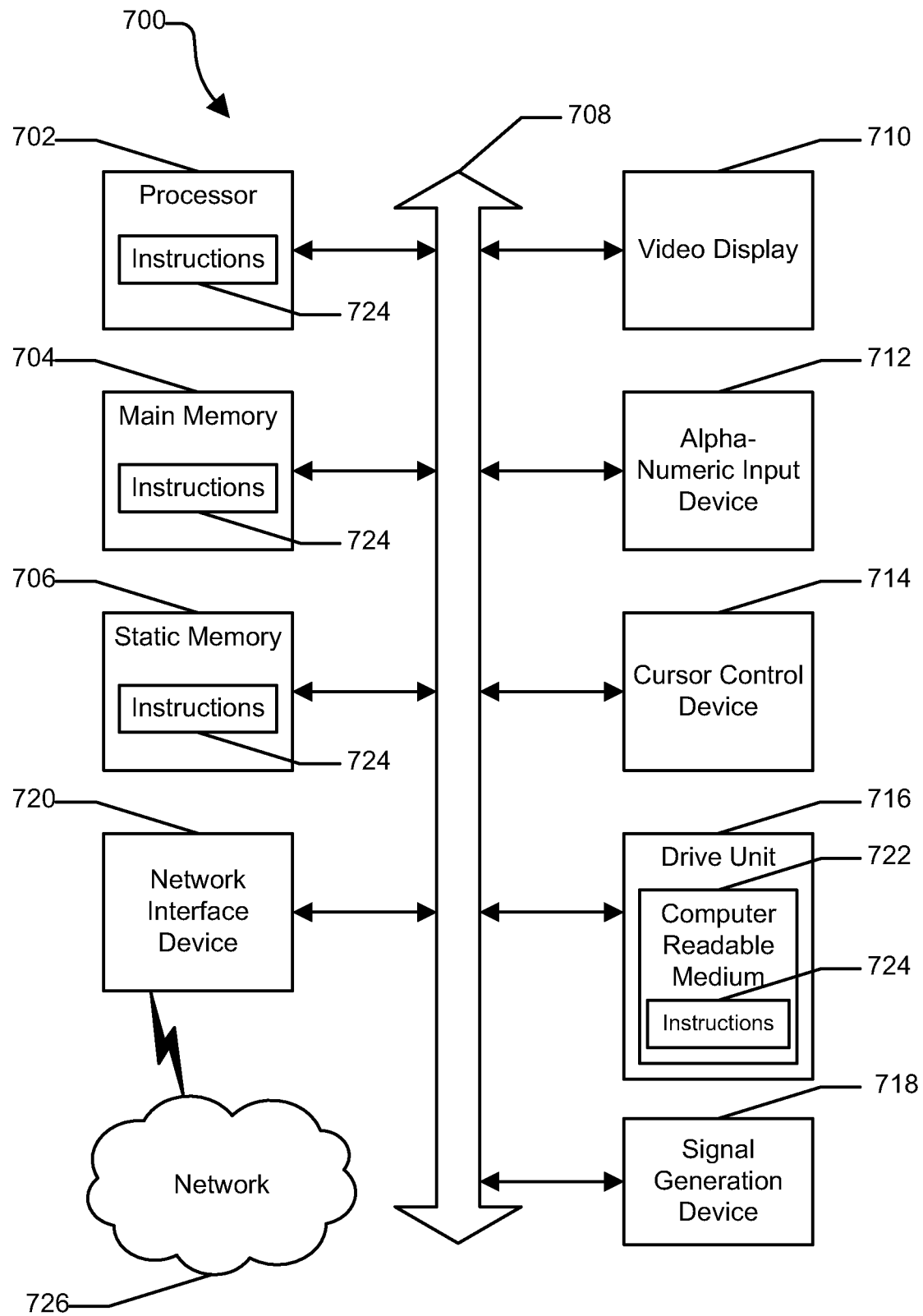
FIG. 7 is an illustrative embodiment of a general computer system.

FIG. 7 shows an illustrative embodiment of a general computer system 700. The computer system 700 can include a set of instructions that can be executed to cause the computer system to perform any one or more of the methods or computer based functions disclosed herein. The computer system 700 may operate as a standalone device or may be connected, such as by using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 700 can also be implemented as or incorporated into various devices, such as a personal computer (PC), a tablet PC, an STB, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 700 can be implemented using electronic devices that provide voice, video or data communication. Further, while a single computer system 700 is illustrated, the term "system" shall also be taken to include any collection of systems or sub-systems that individually or jointly execute a set, or multiple sets, of instructions to perform one or more computer functions.

The computer system 700 may include a processor 702, such as a central processing unit (CPU), a graphics processing unit (GPU), or both. Moreover, the computer system 700 can include a main memory 704 and a static memory 706 that can communicate with each other via a bus 708. As shown, the computer system 700 may further include a video display unit 710 such as a liquid crystal display (LCD), an organic light emitting diode (OLED), a flat panel display, a solid state display, or a cathode ray tube (CRT). Additionally, the computer system 700 may include an input device 712 such as a keyboard, and a cursor control device 714 such as a mouse. The computer system 700 can also include a disk drive unit 716, a signal generation device 718 such as a speaker or remote control, and a network interface device 720 to communicate with a network 726. In a particular embodiment, the disk drive unit 716 may include a computer-readable medium 722 in which one or more sets of instructions 724, such as software, can be embedded. Further, the instructions 724 may embody one or more of the methods or logic as described herein. In a particular embodiment, the instructions 724 may reside completely, or at least partially, within the main memory 704, the static memory 706, and/or within the processor 702 during execution by the computer system 700. The main memory 704 and the processor 702 also may include computer-readable media.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGS. are to be regarded as illustrative rather than restrictive.

The Abstract of the Disclosure is provided to comply with 37 C.F.R. § 1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A non-transitory machine-readable storage medium, comprising executable instructions that, when executed by a processing system including a processor, facilitate performance of operations, comprising:
  receiving a request for a video stream from among services from a first equipment of a plurality of customer premises equipment that receive services from equipment of a video head-end office of an interactive television network;
  detecting a conflicting event based on a determination that supplying the video stream to the first equipment would exceed a bandwidth configuration of the plurality of the customer premises equipment;
  determining a number of times that other conflicting events were created by the first equipment; and
  updating the bandwidth configuration based on the number of times that other conflicting events were created by the first equipment.

2. The non-transitory machine-readable storage medium of claim 1, wherein the operations further comprise determining whether to reconfigure the bandwidth configuration of the first equipment and the equipment of the video head-end office to resolve the conflicting event.

3. The non-transitory machine-readable storage medium of claim 1, wherein the bandwidth configuration includes a number of video streams for the plurality of customer premises equipment.

4. The non-transitory machine-readable storage medium of claim 1, wherein the bandwidth configuration comprises a first number of high definition video streams and a second number of standard definition video streams allocated to the first equipment.

5. The non-transitory machine-readable storage medium of claim 1, wherein the first equipment comprises a set-top box.

6. The non-transitory machine-readable storage medium of claim 1, wherein the operations further comprise storing the bandwidth configuration of the plurality of customer premises equipment.

7. The non-transitory machine-readable storage medium of claim 6, wherein the bandwidth configuration of the plurality of customer premises equipment is stored at a first server as stored configuration information, and wherein the receiving the request for the video stream is stored at the first server as stored request information.

8. The non-transitory machine-readable storage medium of claim 7, wherein the operations further comprise translating a first format of the stored configuration information and a second format of the stored request information to a third format of the stored configuration information and a fourth format of the stored request information, wherein the third format and the fourth format are formatted for use in a second server.

9. The non-transitory machine-readable storage medium of claim 8, wherein the operations further comprise transmitting the third format and the fourth format to the second server.

10. A method, comprising:
  determining, by a processing system comprising a processor, a bandwidth configuration of a plurality of customer premises equipment that receive services from equipment of a video head-end office of an interactive television network;
  receiving, by the processor, a request for a video stream from among the services from a first equipment of the plurality of the customer premises equipment;
  receiving, by the processor, an indication of a conflicting event based on a received indication that supplying the video stream to the first equipment would exceed the bandwidth configuration of the plurality of the customer premises equipment;
  determining, by the processor, a number of times that other conflicting events were created by the first equipment responsive to the indication; and
  updating, by the processor, the bandwidth configuration based on the number of times responsive to the indication.

11. The method of claim 10, further comprising determining whether to reconfigure the bandwidth configuration of the first equipment and the equipment of the video head-end office to resolve the conflicting event.

12. The method of claim 10, wherein the bandwidth configuration comprises a number of video streams for the plurality of customer premises equipment.

13. The method of claim 10, wherein the bandwidth configuration comprises a first number of high definition video streams and a second number of standard definition video streams allocated to the first equipment.

14. The method of claim 10, further comprising storing the bandwidth configuration of the plurality of customer premises equipment.

15. The method of claim 14, wherein the bandwidth configuration of the plurality of customer premises equipment is stored at a first server as stored configuration information, and wherein the receiving the request for the video stream is stored at the first server as stored request information.

16. The method of claim 15, further comprising transmitting the stored configuration information and the stored request information to a second server.

17. A non-transitory machine-readable storage medium, comprising executable instructions that, when executed by a processing system including a processor, facilitate performance of operations, comprising:
  receiving a bandwidth configuration of a customer premises for customer premises equipment that receives services from equipment of a video head-end office of an interactive television network;
  receiving an indication that a first equipment of the customer premises equipment requested a video stream exceeding a first bandwidth configuration of the plurality of the customer premises;
  determining a number of times that the first equipment of the customer premises equipment requested a video stream exceeding a limit of the first bandwidth configuration of the customer premises; and
  updating the bandwidth configuration to an updated bandwidth configuration responsive to the indication and based on the number of times that the first equipment of the customer premises equipment requested a video stream exceeding a limit of the first bandwidth configuration of the customer premises.

18. The non-transitory machine-readable storage medium of claim 17, wherein the operations further comprise determining a second bandwidth configuration based on a number of video streams received by the customer premises when the indication was received.

19. The non-transitory machine-readable storage medium of claim 18, wherein the first bandwidth configuration is based on an allocated bandwidth for the customer premises.

20. The non-transitory machine-readable storage medium of claim 18, wherein the updated bandwidth configuration is based on a difference between the first bandwidth configuration and the second bandwidth configuration.

* * * * *